United States Patent
Nicholson

(10) Patent No.: US 9,626,243 B2
(45) Date of Patent: Apr. 18, 2017

(54) DATA ERROR CORRECTION DEVICE AND METHODS THEREOF

(75) Inventor: James O. Nicholson, Pflugerville, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 2017 days.

(21) Appl. No.: 12/636,074

(22) Filed: Dec. 11, 2009

(65) Prior Publication Data

US 2011/0145676 A1    Jun. 16, 2011

(51) Int. Cl.
  G06F 11/00   (2006.01)
  G06F 11/10   (2006.01)

(52) U.S. Cl.
  CPC ............... G06F 11/1012 (2013.01)

(58) Field of Classification Search
  None
  See application file for complete search history.

(56) References Cited

U.S. PATENT DOCUMENTS

| | | | |
|---|---|---|---|
| 5,136,592 A * | 8/1992 | Weng | 714/762 |
| 5,922,080 A | 7/1999 | Olarig | |
| 6,574,746 B1 * | 6/2003 | Wong et al. | 714/6.2 |
| 2004/0199851 A1 * | 10/2004 | Quach et al. | 714/758 |
| 2005/0172207 A1 | 8/2005 | Radke et al. | |
| 2006/0248411 A1 * | 11/2006 | Kirscht | 714/704 |
| 2010/0037117 A1 * | 2/2010 | Pescatore | 714/752 |
| 2010/0223525 A1 * | 9/2010 | Wuu et al. | 714/755 |

FOREIGN PATENT DOCUMENTS

| WO | WO2007036834 A2 | 5/2007 |
|---|---|---|
| WO | WO2009028281 A1 | 5/2009 |

OTHER PUBLICATIONS

PCT Search Report mailed Mar. 9, 2011 for International Application No. PCT/US2010/059847, 5 pages.

* cited by examiner

*Primary Examiner* — Christopher McCarthy

(57) ABSTRACT

A method and device for error detection includes performing error detection for each data word received in a burst access to a memory. When no error is detected, the data words are written to a cache and indicated as valid data. In response to detecting an error in a data word, the error is corrected and the corrected data written to the cache without indicating the data as valid. In addition, the location of the detected error, indicating the data symbol associated with the error, is recorded in an error vector. The error vectors associated with each data word in the burst access are compared to determine whether a detected error was properly corrected.

20 Claims, 7 Drawing Sheets

DATA ERROR CORRECTION DEVICE AND METHODS THEREOF

FIELD OF THE DISCLOSURE

The present disclosure relates to data processing devices and more particularly to error correction for data processing devices.

BACKGROUND

Data processing devices, such as computer servers, are sometimes used in environments where outages can cause major disruptions to operations. Such outages can be caused by memory failures. Accordingly, it is typically desirable to design the data processing device with sufficient redundancy so the device can continue operations even when a particular memory module fails. Some data processing devices employ error correcting codes (ECC) to improve memory reliability.

ECC's typically use Reed-Solomon codes which oversample a polynomial constructed from the data. The polynomial evaluation is called the check field and is saved with the data in memory. The check field provides for reconstruction of the original data if part of the data, or the check field itself, is lost or garbled. Data is organized in groups of bits called symbols. Loss of any or all bits in a symbol may be recovered. Typically, all data bits from each memory chip are fully contained in a symbol, so loss of any or all bits of a memory chip is fully recoverable. Memory chip width thus determines symbol size.

In particular, when a unit of data (referred to as a data word) is stored in memory, a memory controller calculates a set of checkbits (the check field) based on the value of the data being stored and stores the set of checkbits in memory along with the data. When the data word is requested from memory, the memory controller retrieves the data stored at the data word address and calculates a new set of checkbits. The memory controller compares the new set of checkbits to the stored set of checkbits, whereby a difference in the sets indicates an error in the stored word. In particular, in the event of an error the comparison of checkbits identifies the symbol in the data word where the error is located and which bits in the symbol are to be corrected.

The number of errors in a word that can be detected and corrected depends on the number of checkbits associated with the data word. This is determined by memory system geometry and is associated with intrinsic system characteristics such as cache line size. Cache line size cannot be changed without potentially affecting correct operation of existing programs. For example, in x86 servers with 64-byte cache line size, two 9 byte (72 bit) memory channels are typically coupled to provide 18 byte (144 bit) memory width. Memory chips typically provide data across a 4-beat burst, resulting in each access providing 72 bytes. This is organized as 64 bytes of data and 8 bytes (64 bits) of check bits.

x86 servers employing 4-bit memory chips typically organize ECC with 16 checkbits for each 128-bit data word, with each data word including 36 data symbols with 4 bits per symbol. Codes are often designed with an additional symbol for RAS (Reliability, Availability, and Serviceability). Typical codes provide correction of all single-symbol errors and guarantee detection of all double-symbol errors, providing correction of all single memory chip failures and detection of additional single-bit errors. Increasing symbol size for 8-bit memory chips results in 18 data symbols with 8-bits per symbol. Such an ECC is capable of correcting all single-symbol errors but cannot reliably detect all double-symbol errors. Theory shows that 6.67% of all double-symbol errors will be detected as a single-symbol error, resulting in an error misdetection and miscorrection. That value is too high to be acceptable in enterprise-class servers. Although the likelihood of error misdetection can be eliminated by increasing the number of checkbits associated with a data word, this undesirably increases memory size and is incompatible with cache line size.

The probability of error misdetection can also be reduced by interleaving the bits of multiple data words prior to transmitting the bits to the memory controller for error detection. The data words are reassembled at the memory controller for error detection and correction. Interleaving of the data words reduces the likelihood that a transmission error will cause multiple errors in a single data symbol. However, interleaving undesirably increases memory access latency. Accordingly, an improved method and device for correcting errors in stored data would be useful.

DETAILED DESCRIPTION

Figure 1:
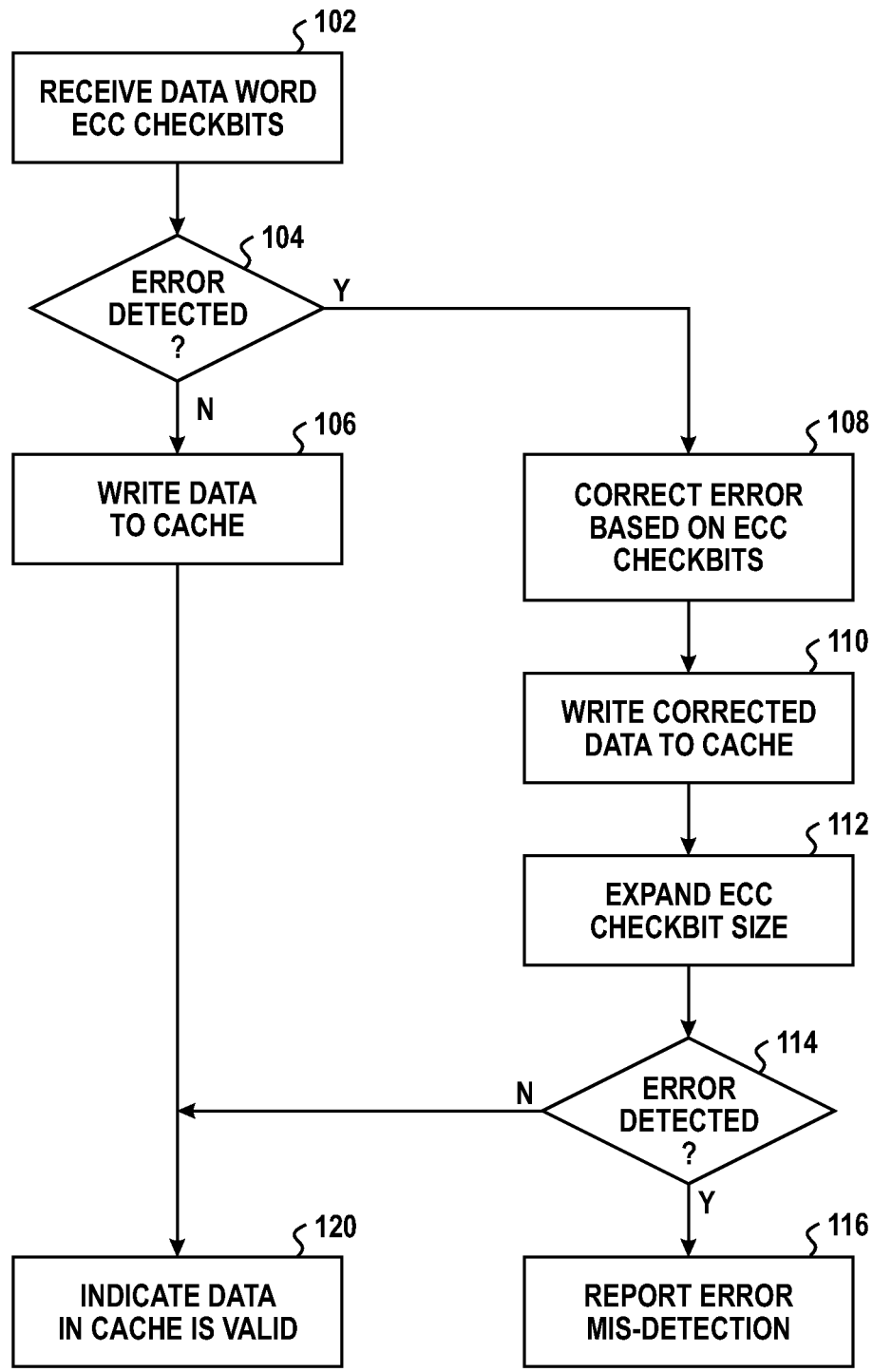
FIG. 1 is a flow diagram illustrating a method of detecting errors for data stored at a memory in accordance with one embodiment of the present disclosure.

A method and device for error detection is disclosed. The method includes performing error detection for each data word received in a burst access to a memory. When no error is detected, the data words are written to a cache and indicated as valid data. In response to detecting an error in a data word, the error is corrected and the corrected data written to the cache without indicating the data as valid. In addition, the location of the detected error, indicating the data symbol associated with the error, is recorded in an error vector. The error vectors associated with each data word in the burst access are compared to determine whether a detected error was properly corrected. The validity of the corrected data is not indicated until after the comparison to ensure that miscorrected data is not accessed. Thus, valid data is made available before error detection is performed on all data words in the burst access, reducing latency, while the comparison of error vectors reduces the likelihood of error miscorrection.

In particular, as described further herein, ECC properties can be utilized so that ECC check field size is increased in response to an error situation. This reduces error miss-correction probability. For example, in one embodiment, during normal (non-error) operation, error detection and correction proceeds as a (19, 16) single symbol error correcting code with a symbol size eight. The data is forwarded to a cache for storage immediately. Check field size is adaptively increased in response to determining a correction cycle is required. Further, if correction is required, data forwarding to the cache is delayed until additional data beats have been examined for errors.

As described herein, a syndrome resulting from a multi-symbol error in symbol columns i and j will not alias to a syndrome produced by single errors in either symbol columns i or j. Accordingly, a transient error mixed in the same memory access as a hard fault will change the indicated symbol-in-error. This is because the hard fault will result in an error across all data beats of the memory access while the transient error will typically result in an error in a single data beat. Thus, the difference in single and multi-symbol errors can be detected by comparing the first detected symbol-in-error against errors detected in other data beats of the memory access. A hard fault will typically point to one symbol-in-error while a transient error will point to a different one.

Use of the above described technique reduces the likelihood of error misdetection and miscorrection. In a particular embodiment, such as an x86 data processing device, each data word includes 18 data symbols of 8 bits each, with two of the symbols containing checkbits. If an error occurs, check field size is dynamically increased to improve error detection capability. This configuration provides for single error correction (SEC) and acceptable values for double error detection (DED). The above described technique can reduce probability of misdetection of a double error as a single error to less than 0.00000038%.

The use of error vectors to record error locations for detected errors in a burst access effectively increases the number of ECC checkbits for each beat in the burst access. This can be better understood with reference to FIG. 1, which illustrates a flow diagram of a particular—embodiment of a method of detecting errors for data stored at a memory. At block 102, a data word and associated ECC checkbits are received. At block 104, it is determined based on the ECC checkbits whether the data word includes an error. If not, at block 106 the data word is written to a cache. The method flow moves to block 120 and it is indicated that the cache line including the word stores valid data.

If, at block 104, an error is detected, at block 108 the error is corrected using the ECC checkbits. The corrected data is stored to the cache at block 110. At block 112, the effective ECC checkbit size is expanded. In an embodiment, the ECC checkbit size is expanded by detecting errors for other data words of a memory burst associated with the corrected data word. At block 114, it is determined whether an error is detected based on the expanded ECC checkbit. If not, this indicates that no misdetection occurred. Accordingly, the method flow moves to block 120 and it is indicated that the cache line associated with the corrected data stores valid data. If, at block 114, an error is detected based on the expanded checkbit size, this indicates an error misdetection for the stored corrected data. This misdetection is reported at block 116. In response, appropriate action can be taken; e.g. a memory controller can indicate the corrected data stored at the cache is invalid data.

Figure 2:
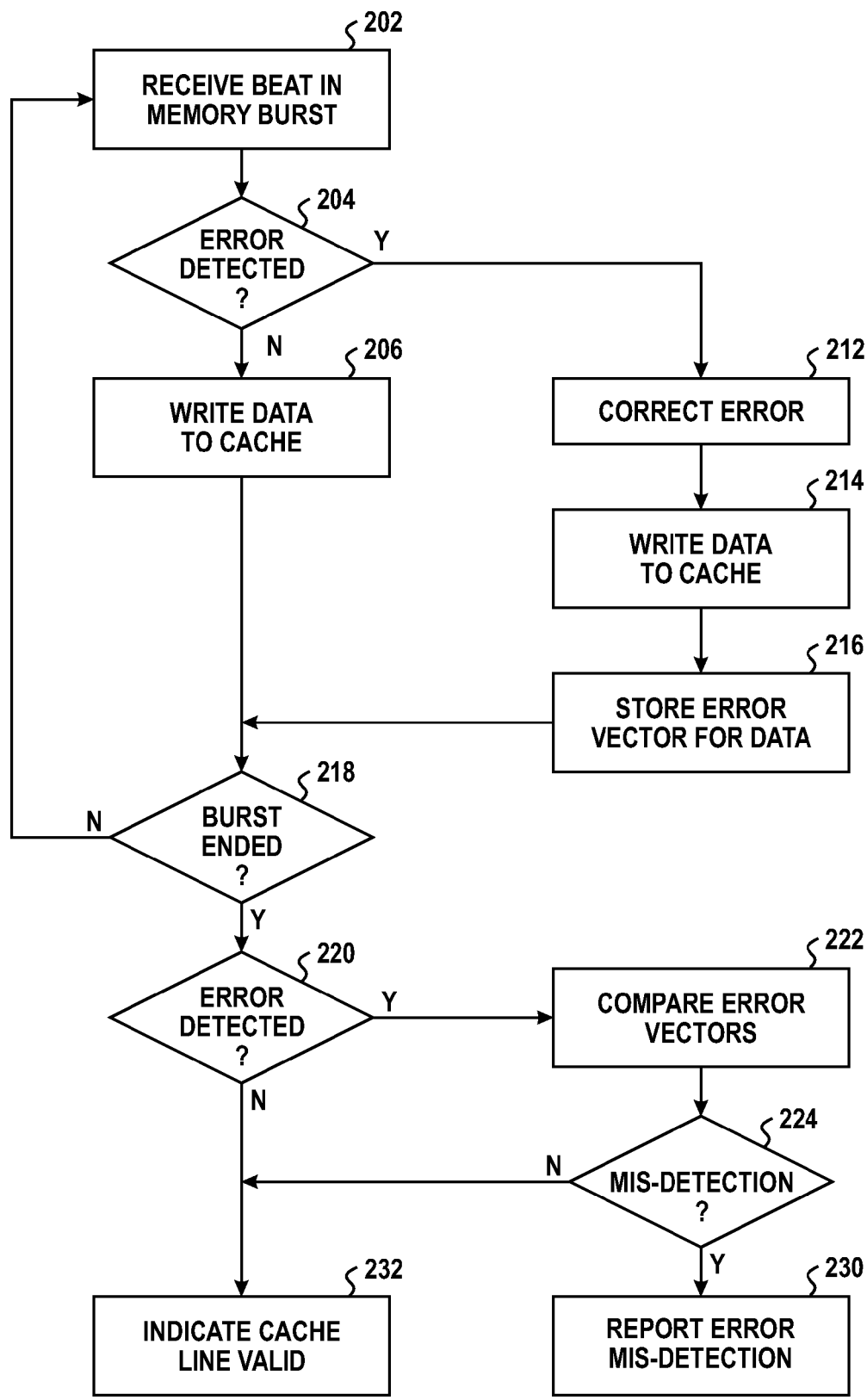
FIG. 2 is a flow diagram illustrating a method of detecting errors for data stored at a memory in accordance with one embodiment of the present disclosure.

FIG. 2 illustrates a flow diagram of a particular embodiment of a method of detecting errors for data stored at a memory. At block 202, a beat in a memory burst is received. The beat includes a data word and associated ECC checkbits. At block 204, it is determined, based on the ECC checkbits whether an error is detected in the data word. If not, the method proceeds to block 206 and the data word is written to the cache. The method flow proceeds to block 218, discussed further below.

If, at block 204 it is determined that the data word includes an error, the method flow proceeds to block 212 and the error is corrected based on the ECC checkbits. At block 214, the corrected data word is written to the cache at a cache line. At block 216 an error vector associated with the data word is stored, whereby the error vector indicates a location of the detected error. At block 218 it is determined whether all beats in the memory access burst have been received. If not, the method flow returns to block 202 to receive additional beats. If all beats have been received, at block 220 it is determined whether an error was detected for any data words associated with the access burst. If not, at block 232 it is indicated that the cache line associated with the access burst stores valid data.

If, at block 220, it is determined that an error was detected for the access burst, at block 222 the error vectors are compared to determine the relative locations of detected errors. At block 224, it is determined based on the comparison whether a misdetection has occurred. If not, the method moves to block 232 and it is indicated that the cache line associated with the access burst stores valid data. If a misdetection has occurred, the method moves to block 230 and the misdetection is reported.

Figure 3:
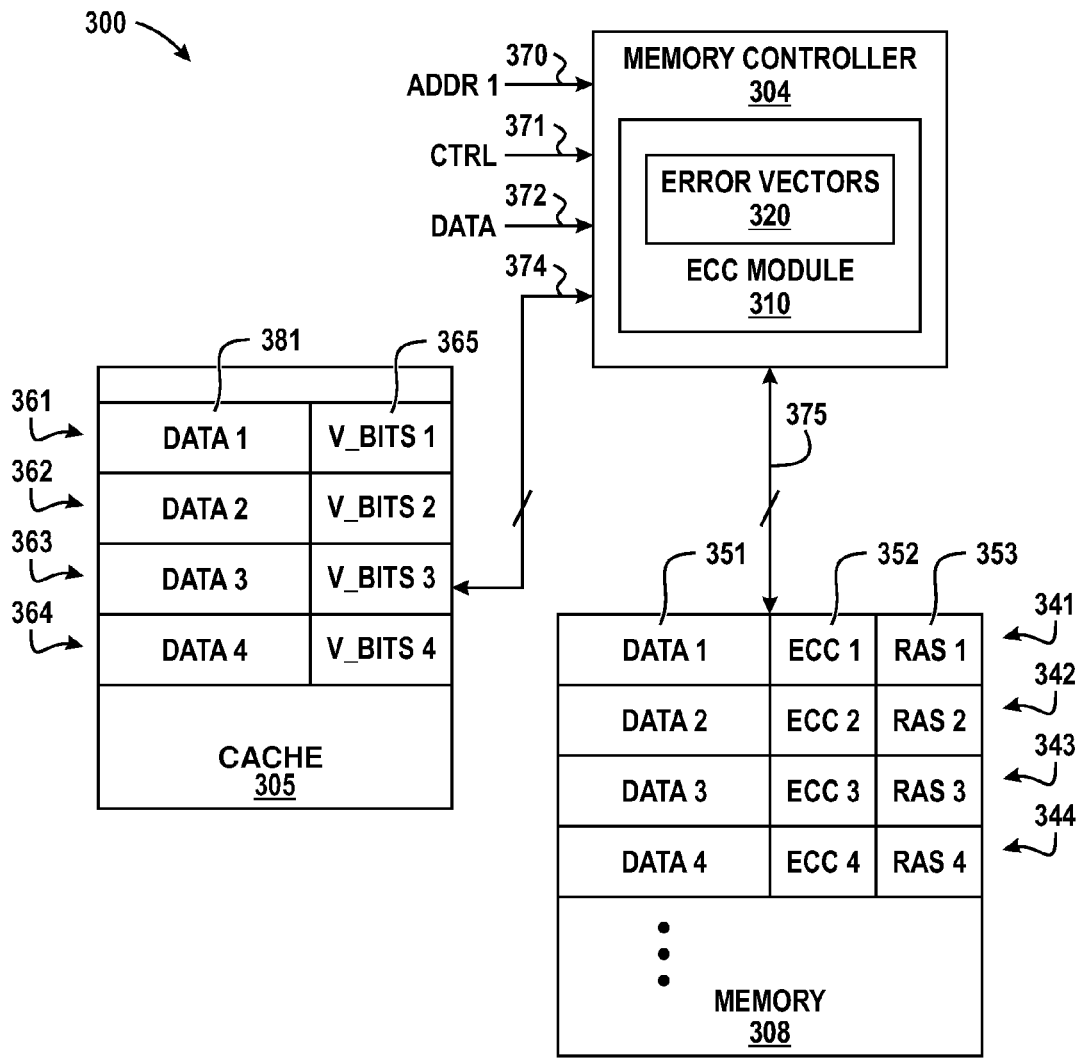
FIG. 3 is a block diagram of a data processing device in accordance with one embodiment of the present disclosure.

FIG. 3 illustrates a block diagram of a particular embodiment of a data processing device 300 including a memory controller 304, a cache 305, and a memory 308. The memory controller 304 is connected to a bus 370, labeled ADDR1, a bus 371 labeled CTRL, and a bus 372 labeled DATA. The memory controller 104 also includes connections to bi-directional busses 374 and 375. It will be appreciated that although for purposes of discussion busses 373-376 are illustrated as single bi-directional busses, each illustrated bus can represent multiple uni-directional busses. For example, bus 375 can represent separate address and data busses. The cache 305 includes a connection to the bus 374. The memory 308 includes a connection to the bus 375.

The memory 308 is volatile memory, such as random access memory (RAM), and includes a number of memory locations, such as memory locations 341, 342, 343, and 344. Each memory location is associated with a unique memory address. In response to receiving a memory address via the bus 375, the memory 308 provides information stored at the associated memory location via the bus 375. Each memory location of the memory 308 is configured to store multiple types of information, including a data word, checkbits associated with the data word, and (optionally) Reliability, Availability, and Serviceability (RAS) information associated with the data word. RAS information is typically encoded in a spare symbol not affiliated with specific sets of memory bits. Rather, the data affiliated with that symbol is implied to be zero and does not require real memory bits. Storing non-zero RAS information results in unique check bit encodings which result in a single-symbol error in the spare symbol location. Indicated bits-in-error identify the original encoded RAS information. For example, at memory location 341, the memory stores data word 351 (labeled DAT1), checkbits 352 (labeled ECC1), and RAS information 353 (labeled RAS1). The RAS information represents information designated to enhance the reliability, serviceability, and availability of the data 351.

The cache 305 includes a number of cache locations, such as cache lines 361, 362, 363, and 364, whereby each cache line is associated with a unique cache TAG. Each cache line stores multiple types of information, including a data word and validity information associated with the data. For example, cache location 361 stores data 381 and associated validity information 365. The validity information indicates whether the associated data is valid for use in operations at the data processing device 300.

The memory controller 304 is configured to receive and fulfill memory access requests by providing the requested data. In addition, the memory controller 304 is configured to manage the storage of data between the memory 308, and the cache 305 so that memory access requests can be efficiently fulfilled. In an embodiment, the memory controller 304 is configured to ensure that recently requested data is available at the cache 305 and less recently requested data is available at the memory 308. Moreover, the memory controller 304 ensures that there is data redundancy, so that data stored at the cache 305 is maintained at the memory 308.

To illustrate, a memory access request is initiated at the memory controller 304 when an address is received via the bus 370. In response, the memory controller 304 determines whether the data associated with the address is stored at the cache 305. If so, the memory controller 304 retrieves the requested data word by providing the cache address associated with the data word via the bus 374, and receiving the requested data word via the same bus. The memory controller 304 then provides the requested data word to the bus 372, and provides information via the bus 371 indicating completion of the memory access request.

If the requested data word is not located at the cache 305 and is located at the memory 308, the memory controller 304 copies the requested data from the memory 308 to the cache 305, as described below.

To copy data from the memory 308 to the cache 305 the memory controller 304 executes a burst access. As used herein, the term "burst access" refers to retrieving multiple data words from memory in multiple iterations. For purposes of discussion, retrieval of each data word is referred as a "beat" of the burst access. Thus, for purposes of discussion an N-beat burst access refers to a burst access wherein N data words are retrieved. In a particular embodiment, N is 4.

A burst access can be better understood with reference to an example. In the illustrated embodiment of FIG. 3, the memory 308 stores data words DATA1, DATA2, DATA3, and DATA4, together with associated ECC checkbits and RAS information, at memory locations 341, 342, 343, and 344, respectively. The memory controller 304 receives an address associated with the data word DATA1 via the bus 370. In response, the memory controller 304 determines that DATA1 is stored at the memory 308, and provides the associated memory address via the bus 375. This initiates a burst access, whereby data words DATA1, DATA2, DATA3, and DATA4, together with their associated ECC checkbits and RAS information, are provided in a series of 4 beats. In particular, for the first beat the data word DATA1, ECC checkbits ECC1, and RAS information RAS1 are provided via the bus 375, for the second beat the data word DATA2, ECC checkbits ECC2, and RAS information RAS2, and so on.

The memory controller 304 performs error detection and error correction for each beat in the burst access. In particular, the ECC module 310 performs error correction based on the ECC checkbits associated with the data word. Until an error is detected, the memory controller 304 copies each data word to the cache and indicates the data is valid in the associated validity information at the cache. In addition, if the target data identified by the received address is indicated as valid data, the memory controller 304 provides the data immediately via the bus 372, and indicates the data has been retrieved via the bus 371, so that the associated instruction can be retired.

In response to detecting an error in a beat of a burst memory access, the ECC module 310 determines if the error is correctable. If not, the ECC module informs the memory controller 304, which can take appropriate action. For example, the memory controller 304 can attempt to re-copy the data from the memory 308, or retrieve the data from the non-volatile memory 306. If the ECC module 310 determines that the error is correctable, it stores an error vector at the error vectors 320 to indicate the symbol containing the error.

Figure 4:
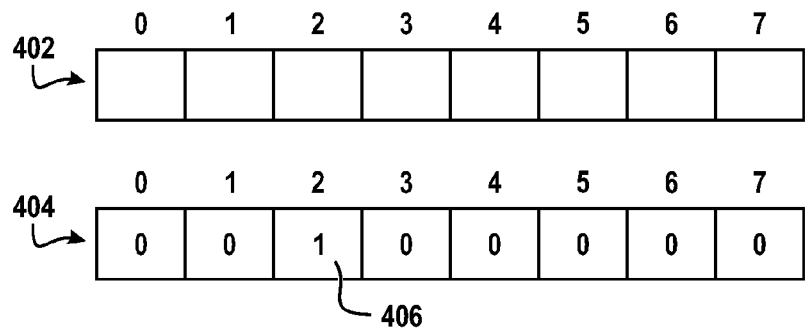
FIG. 4 is a block diagram illustrating a data word and associated error vector in accordance with one embodiment of the present disclosure.

The error vectors 320 can be better understood with reference to FIG. 4, which illustrates a data word 402 and a corresponding error vector 404. In the illustrated embodiment, the data word 402 includes 8 data symbols, numbered 0 through 7. Each data symbol represents one or more bits of the data word 402. The error vector 404 includes fields numbered 0 through 7, with each field associated with the corresponding symbol of the data word 420. The value stored at each field of the error vector 404 is indicative of whether an error has been detected at the corresponding symbol of the data word 402. In the illustrated embodiment, a value of "0" indicates no error has been detected, while a value of "1" indicates an error has been detected. Thus, in the illustrated example of FIG. 4, field 406 indicates an error has been detected in symbol 2 of the data word 402.

In response to detecting an error in a beat of a burst access, the ECC module 310 records error vectors for the data associated with that beat and for the data associated with each subsequent beat at the error vectors 420. The recorded error vectors are compared to determine whether any detected error is a correctable or uncorrectable error. This can be better understood with reference to FIGS. 5-8, which illustrate exemplary error vectors and associated memory access beats.

Figure 5:
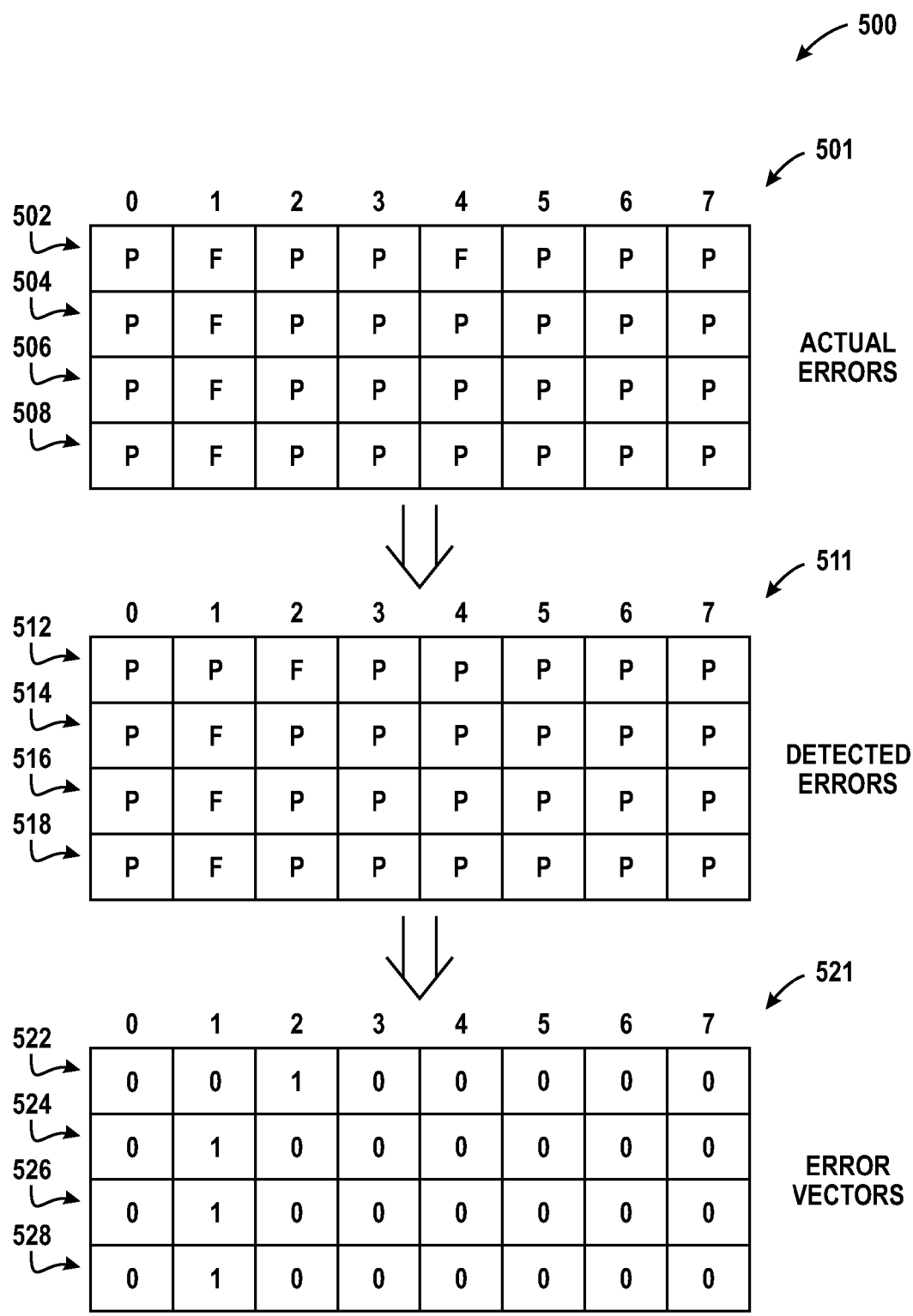
FIG. 5 is a block diagram illustrating a set of error vectors in accordance with one embodiment of the present disclosure.

FIG. 5 illustrates a sequence 500 of beats of a memory access. Table 501 indicates the location of errors and valid data for data transmitted from the memory 308 to the memory controller memory controller 304. In particular, table 501 sets forth the locations of errors for beats 502, 504, 506, and 508. For purposes of discussion, a "P" in table 501 indicates no error is present for the corresponding symbol, while an "F" indicates an error for the corresponding symbol. Thus, table 501 indicates there is an error for symbol 1 of the data associated with each of beats 502-508, and also indicates an error for symbol 4 of the data associated with beat 502.

Table 511 indicates the detected errors at the ECC module 510 for each of the beats 502, whereby rows 512, 514, 516, and 518 correspond to the detected errors for beats 502, 504, 506, and 508, respectively. Thus, in the illustrated embodiment, rows 514, 516, and 518 indicate an error has been detected in symbol 1 of each the data words associated with data beats 504, 506, and 508. As illustrated by table 501, this indicates that the ECC module 310 has correctly detected the errors for these data beats. However, row 352 indicates that ECC module 512 has detected for symbol 2 of the data word associated with beat 502. As illustrated in table 501, the detected errors indicated by row 512 do not correspond to the actual errors in the transmitted data associated with beat 502, indicating a misdetection.

Table 521 illustrates a table 521 showing error vectors 522, 524, 526, and 528, based on the detected errors reflected in table 511. In particular, vectors 522, 524, 526, and 528 correspond to rows 512, 514, 516, and 518 of table 511 respectively, and indicate the location of detected errors in the data words associated with the data beats 502-508.

In operation, in response to detecting an error in beat 502, the ECC module 310 records error vector 522 to record the location of the detected error, and also records error vectors 524-528 to record the locations of detected errors for the corresponding data beats. After recording the error vectors 522-528, the ECC module 310 compares the locations of the detected errors and determines whether a misdetection has occurred. Accordingly, in the illustrated example of FIG. 5, the ECC module 310 determines that 3 of the 4 error vectors 522-528 indicated a detected error at symbol 1 of the corresponding data beat. This indicates a likelihood that a memory chip corresponding to those symbols has a faulty storage location, and further implies that data beat 502 should have a similar error at symbol 1. However, because error vector 522, associated with the beat 502, does not indicate an error in symbol 1, and indicates an error in another symbol (symbol 2), the ECC module 310 determines that the detected error for beat 502 was a mis-detection. In response, the memory controller 304 indicates in the cache 305 that the data associated with all beats are likely to be invalid. It is possible that error data may alias to the original stored data in any given beat. In that case, no error is indicated or correction applied to that beat and the error vector is not considered in error vector comparison.

Figure 6:
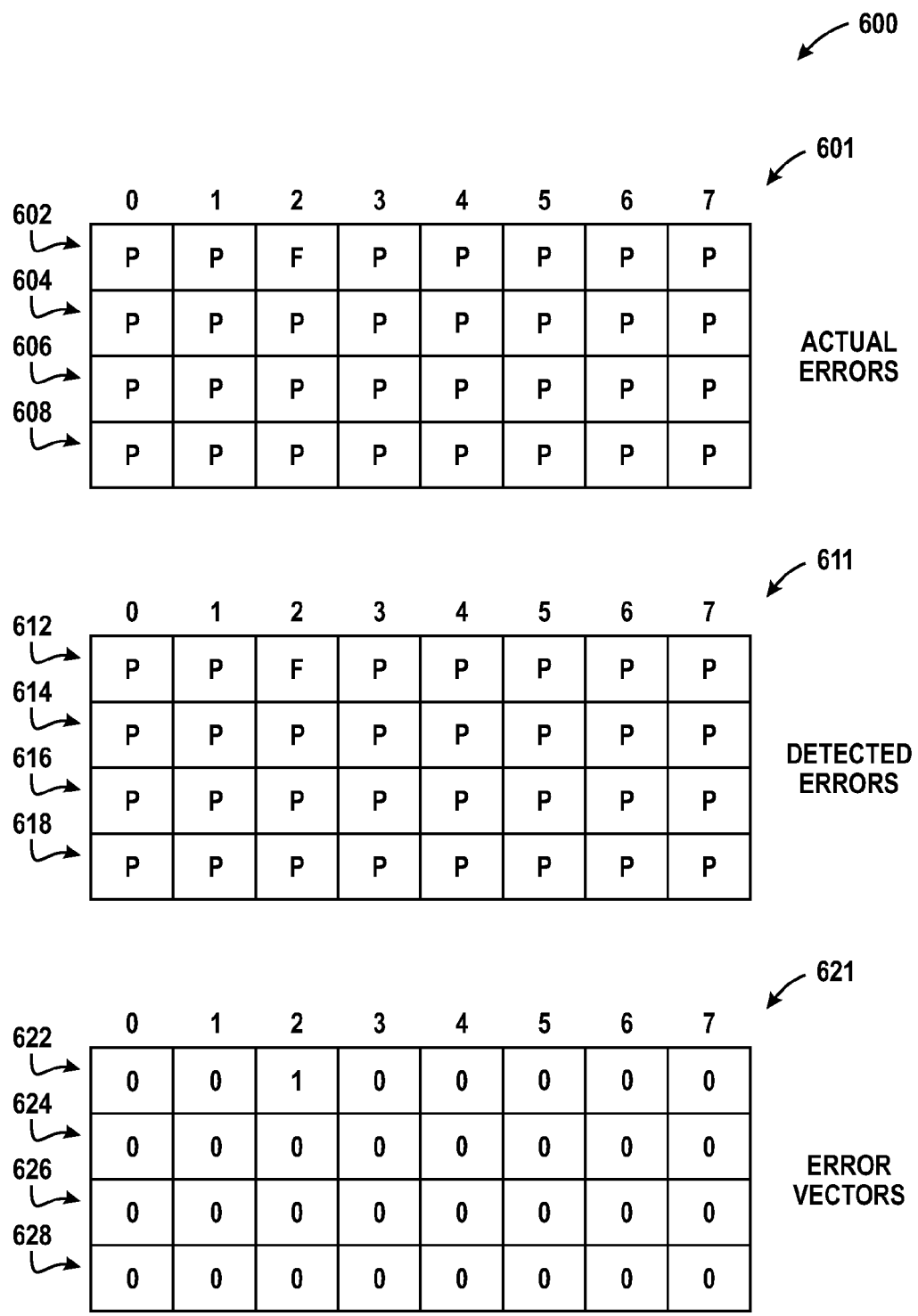
FIG. 6 is a block diagram illustrating another set of error vectors in accordance with one embodiment of the present disclosure.

Referring to FIG. 6, a set 600 of memory access beats and associated error vectors is illustrated. Tables 601, 611, and 621 correspond to tables 501, 511, and 521 of FIG. 5, respectively, and set forth similar information. Accordingly, in the illustrated example of FIG. 6, the only error in the data words associated with beats 602, 604, 606, and 608 is at symbol 2 of each data word associated with beat 602. Rows 612, 614, 616, and 618 of table 611 indicate that the errors are detected correctly at the ECC module 620. In response to detecting the error for beat 602, the ECC module 420 records error vectors 622, 624, 626, and 628 and compares the indicated error locations. Based on this comparison, the ECC module 620 determines that the error for the data associated with beat 602 was correctly detected and corrected. In response, the memory controller indicates that the associated data word stored at the cache 305 is valid data.

Figure 7:
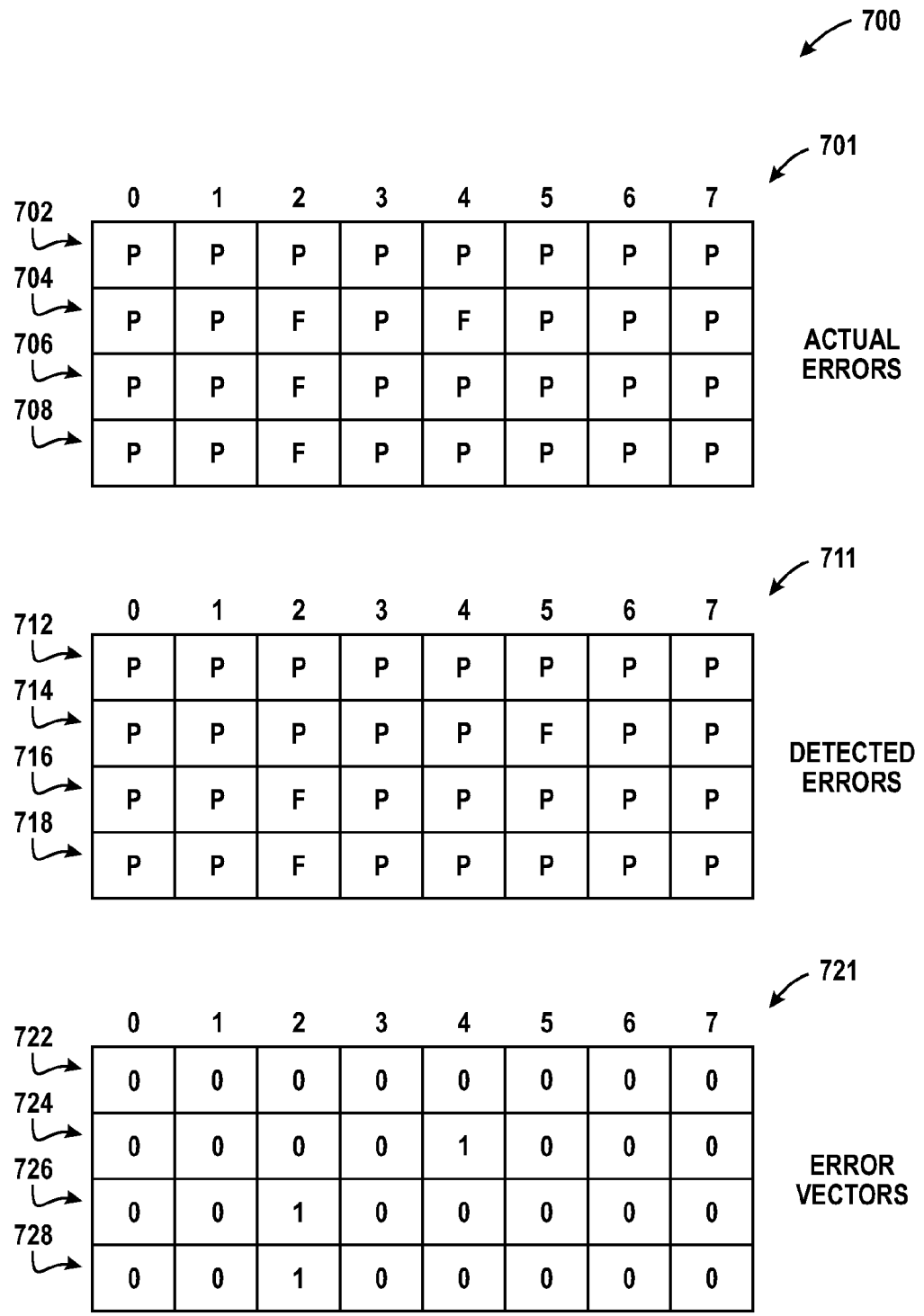
FIG. 7 is a block diagram illustrating still another set of error vectors in accordance with one embodiment of the present disclosure.

Referring to FIG. 7, a set 700 of memory access beats and associated error vectors is illustrated. Tables 701, 711, and 721 correspond to tables 501, 511, and 521 of FIG. 3-5, respectively, and set forth similar information. Accordingly, in the illustrated example of FIG. 7, no errors are present or detected for beat 702. Errors are present in symbols 2 and 4 of the data word associated with beat 704. However, as indicated by row 714 of table 711, the errors for beat 704 are misdetected as a single error at symbol 5. In addition, errors are present at symbol 2 of data words associated with beat 706 and 708, respectively. As indicated by rows 716 and 718 of table 711, these errors are correctly detected by the ECC module 110.

The ECC module 110 compares the error locations indicated by error vectors 722, 724, 726, and 728. Because all non-zero error vectors did not agree, beats with non-zero error vectors are considered invalid. Accordingly, the memory controller indicates that associated data word(s) stored at the cache 305 are invalid.

Figure 8:
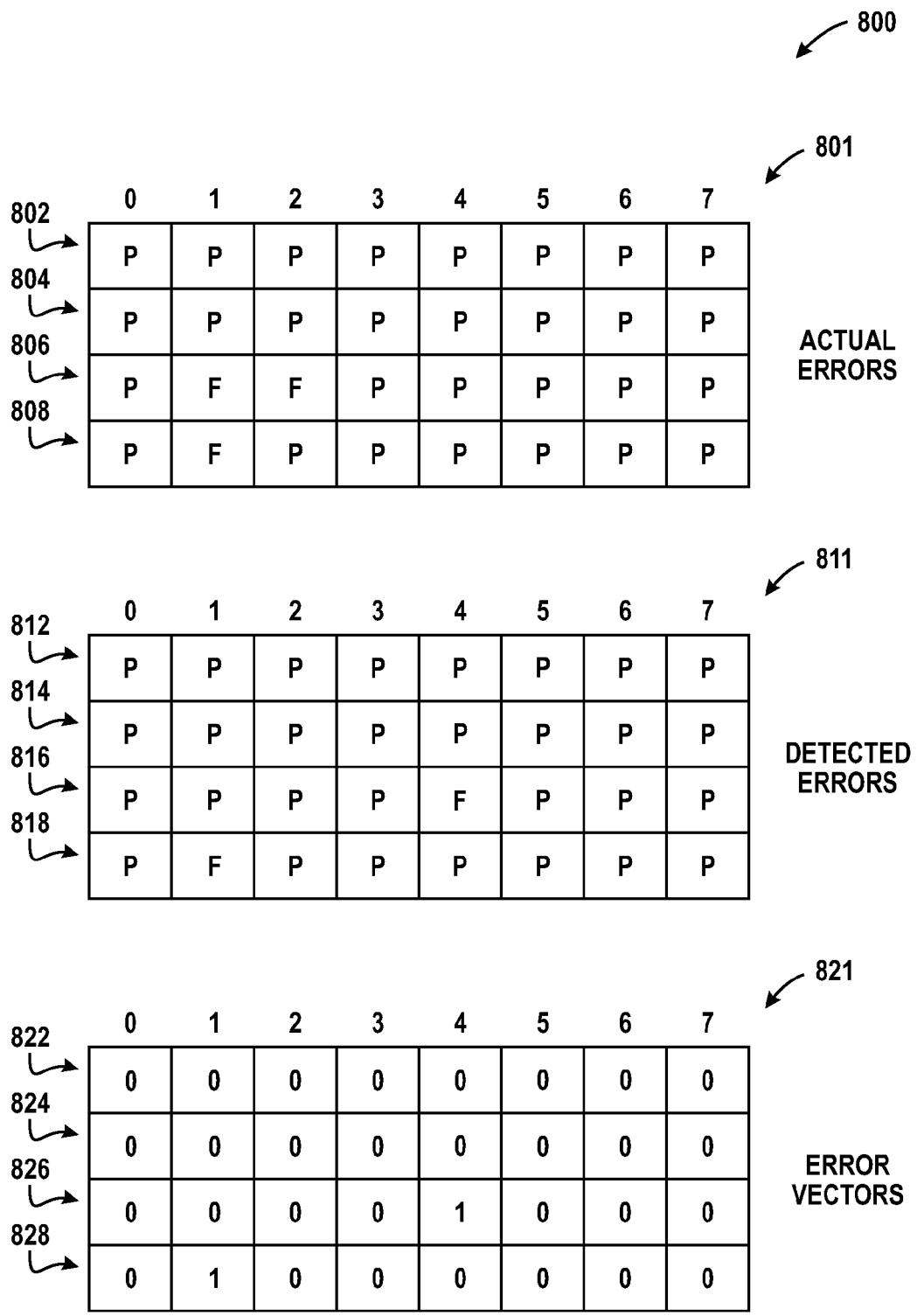
FIG. 8 is a block diagram illustrating yet another set of error vectors in accordance with one embodiment of the present disclosure.

Referring to FIG. 8, a set 800 of memory access beats and associated error vectors is illustrated. Tables 801, 811, and 821 correspond to tables 501, 511, and 521 of FIG. 3-5, respectively, and set forth similar information. Accordingly, in the illustrated example of FIG. 8, actual errors are present at symbols 1 and 2 of beat 806 and symbol 2 of beat 808. As illustrated by table 811, errors are detected at symbol 4 of beat 806 and at symbol 1 of beat 818. Table 821 illustrates the error vectors for each of the beats. Because all non-zero error vectors did not agree, beats with non-zero error vectors are considered invalid.

Returning to FIG. 3, when determining where to store data at the cache 305, the memory controller 304 determines whether space is available in the cache, whereby space availability depends in part on whether valid data is stored at a cache location. Thus, a cache location that stores invalid data is indicated as available space in the cache 305. The memory controller 304 writes data words to available space in the cache 305. Accordingly, by identifying a miscorrected data word as invalid data, the memory controller 304 ensures cache location associated with that data word becomes available to store new data.

Other embodiments, uses, and advantages of the disclosure will be apparent to those skilled in the art from consideration of the specification and practice of the disclosure disclosed herein. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method, comprising:
performing a first error detection for a first data word using first ECC checkbits associated with the first data word;
performing a second error detection for a second data word using second ECC checkbits associated with the second data word; and
in response to the first error detection indicating an error in a symbol of the first data word and the second error detection indicating an error in a symbol of the second data word at a location in the second data word corresponding to a location of the symbol of the first data word, storing a first corrected data word as valid data, wherein the first corrected data word comprises the first data word after being corrected based upon the first ECC checkbits.

2. The method of claim 1, wherein the first corrected data word is based on correcting a single error in the symbol of the first data word.

3. The method of claim 1, further comprising:
in response to the second error detection indicating no error, storing the first corrected data word as valid data.

4. The method of claim 1, further comprising:
in response to the first error detection indicating no error, storing the first data word as valid data.

5. The method of claim 4, wherein storing the first corrected data word comprises storing the first corrected data word in a cache associated with a data processor device that initiated access of the first data word.

6. The method of claim 1, further comprising:
in response to the first error detection indicating the error in the symbol of the first data word and the second error detection indicating an error in a symbol of the second data word at a location in the second data word different than the location of the symbol of the first data word, indicating the first corrected data word is invalid data.

7. The method of claim 1, further comprising:
performing a plurality of error detections for a plurality of data words, the error detections including the first error detection and the second error detection; and
in response to the first error detection indicating the error in the symbol of the first data word and at least one other of the plurality of error detections indicating an error in a symbol of a corresponding data word that is in a location different than the location of the symbol of the first data word, indicating the first corrected data word is invalid.

8. The method of claim 7, further comprising storing the first corrected data word as valid data in response to each of the plurality of error detections indicating an error in a symbol of the corresponding data word at a location of the corresponding data word that corresponds to the location of the symbol of the first data word.

9. The method of claim 8, wherein the plurality of data words are associated with a common burst access of a memory.

10. A device comprising:
a memory controller configured to access a memory, the memory controller comprising
an ECC module to:
access a first data word and a second data word from the memory;
perform a first error detection for a first data word using first ECC checkbits associated with the first data word;
perform a second error detection for a second data word using second ECC checkbits associated with the second data word; and
in response to the first error detection indicating an error in a symbol of the first data word and the second error detection indicating an error in a symbol of the second data word at a location in the second data word corresponding to a location of the symbol of the first data word, storing a first corrected data word as valid data, wherein the first corrected data word comprises the first data word after being corrected based upon the first ECC checkbits.

11. The device of claim 10, further comprising the memory.

12. The device of claim 10, wherein the first corrected data word is based on correcting a single error at the symbol of the first data word.

13. The device of claim 10, wherein the memory controller is to store the first corrected data word as valid data in response to the second error detection indicating no error.

14. The device of claim 10, wherein the memory controller is to identify the first corrected data word as invalid data in response to the first error detection indicating the error in the symbol of the first data word and the second error detection indicating an error in a symbol of the second data word at a location in the second data word different than the location of the symbol of the first data word.

15. In a device coupled to a memory, a method comprising:
accessing a plurality of data words from the memory;
generating an error vector for each data word of the plurality of data words based on ECC bits associated with the data word; and
determining whether the memory has a hard fault based on a comparison of an error status of each error vector at the same symbol location for each corresponding data word.

16. The method of claim 15, wherein determining whether the memory has a hard fault comprises:
determining the memory has a hard fault responsive to an error vector indicating an error in a symbol location of a first data word and at least two other error vectors indicating no error in the symbol location of corresponding data words.

17. The method of claim 15, wherein determining whether the memory has a hard fault comprises:
determining the memory has a hard fault responsive to an error vector indicating no error in a symbol location of a first data word and at least two other error vectors indicating an error in the symbol location of corresponding data words.

18. The method of claim 15, further comprising:
identifying the plurality of data words as invalid responsive to determining the memory has a hard fault.

19. The method of claim 15, further comprising:
correcting a data word of the plurality of data words using the ECC bits associated with the data word to generate corrected data word; and
storing the corrected data word as valid data responsive to determining the memory does not have a hard fault.

20. A memory controller to perform the method of claim 15.

* * * * *